United States Patent Office 2,739,828
Patented Mar. 27, 1956

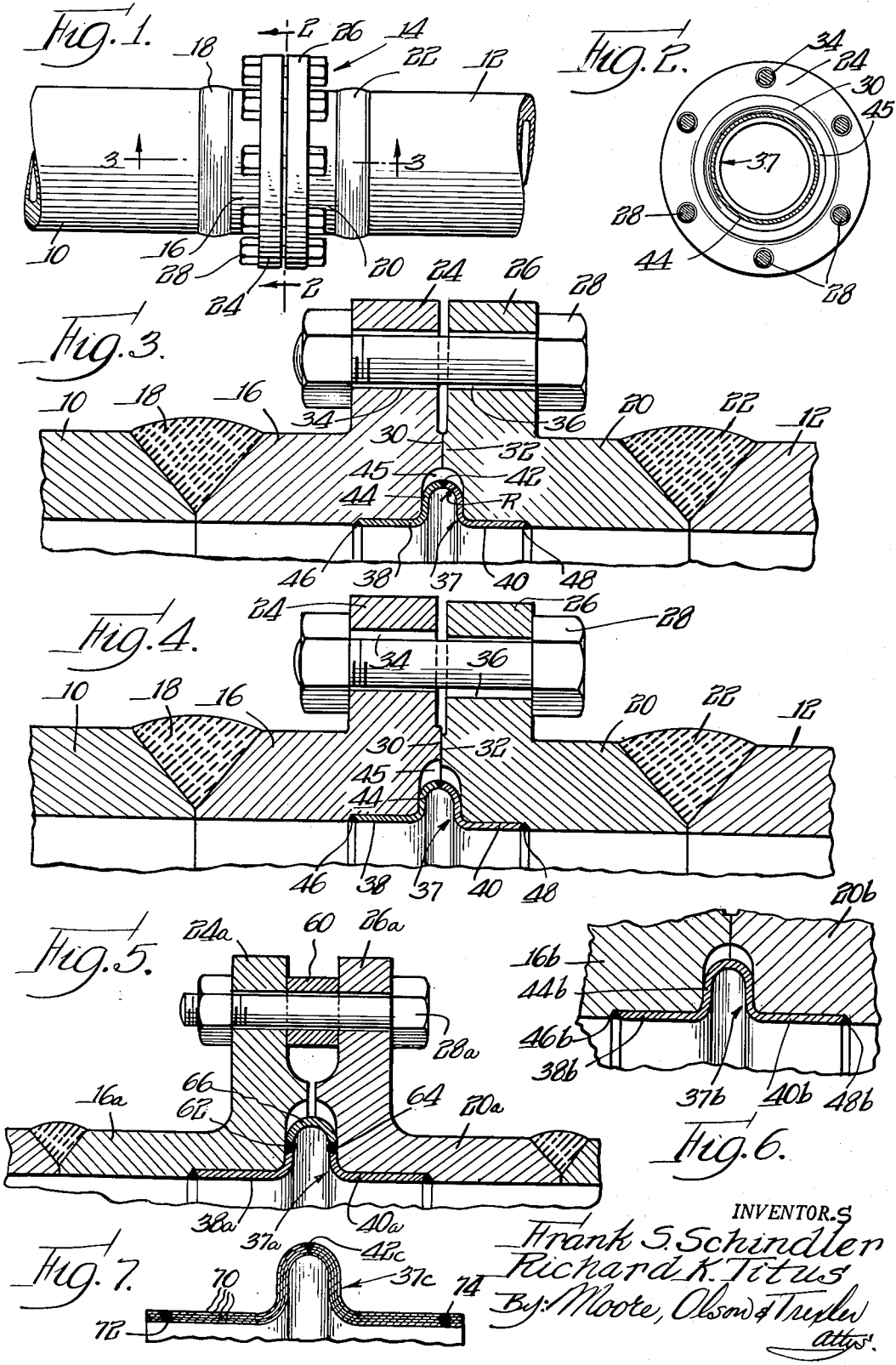

2,739,828

PIPE CONNECTOR WITH FLEXIBLE MATERIAL JOINT

Frank S. Schindler and Richard K. Titus, Elgin, Ill., assignors to Flexonics Corporation, a corporation of Illinois Application December 6, 1949, Serial No. 131,324

5 Claims. (Cl. 285—90)

This invention relates to connection joints for pipes and conduits, and concerns particularly joints for connecting pipes of dissimilar metals and wherein the pipes are subjected to relatively wide temperature variation in use.

In many commercial conduit installations it becomes desirable to use pipes of dissimilar material. In some instances this desirability may be dictated by considerations of economy. In other instances the use of pipes of differing metals may become a necessity, due to the varying service requirements of different parts of the conduit installations.

At the point of juncture of the dissimilar metal pipes difficulties are encountered when the conduit is subjected to conditions of varying temperature, due to the different expansion rates of the juxtaposed dissimilar metals. A tendency toward relative motion results, making it difficult to seal the connection; and if sufficient securing means are used for leak-proofness, shear stresses in the juxtaposed parts occur, leading to rapid deterioration of the joint, and destruction of the leak-proof characteristic.

In accordance with the present invention a conduit or pipe connector is provided wherein the securing means conventionally provided, such for example as securing bolts or the like, is relied upon substantially only to preclude axial separation of the conduit parts; and fluid-tightness is secured by the addition of an auxiliary sleeve member so arranged in the construction as to be leak-proof and also sufficiently flexible so as to permit the parts to shift in accordance with their normal thermal expansion characteristics. The sleeve member and securing means cooperate to provide a durable leak-proof connection, while at the same time avoiding the thermal stressing of the pipe connector parts.

It is accordingly an object of the present invention to provide a new and improved pipe connector, of improved construction and improving operating characteristics, and particularly adapted for the connection of pipes of dissimilar materials in installations subjected to relatively high ranges of temperature fluctuation.

A further object of the invention is to provide a new and improved pipe or conduit connection of the foregoing type, which is of low cost, which may be easily fabricated, and which is durable in service.

A still further object of the invention is to provide an improved pipe connection of the type defined, which will have a bursting strength equal to that of the adjacent pipe or conduit parts.

Another object of the invention is to provide an improved pipe or conduit connection which avoids the difficulties and provides the features heretofore discussed.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a general assembly view of a portion of a conduit installation including a pipe connector constructed in accordance with and embodying the principles of the present invention;

Fig. 2 is a transverse sectional view of the structure illustrated in Fig. 1, taken as indicated by the section line 2—2 thereof;

Fig. 3 is an enlarged, partial, longitudinal, sectional view of the pipe connector of Fig. 1, more particularly showing the arrangement of the parts;

Fig. 4 is a view similar to Fig. 3, showing the parts in a different operating position;

Fig. 5 is a view similar to Fig. 3, but illustrating a modified form of structure; and Figs. 6 and 7 are detail views illustrating still further modified embodiments of the invention, and the principles thereof.

Referring more particularly to the drawings and first to the embodiment illustrated in Figs. 1-4, in Fig. 1 there is shown a portion of a conduit installation comprising a pair of conduits or pipes 10 and 12 interconnected by means of the pipe connector of the present invention, indicated generally by the reference numeral 14. In accordance with the particular embodiment illustrated, such pipe connector more specifically comprises a pipe or conduit piece 16 connected to the pipe 10 by means of an annular weld 18, and a pipe or conduit piece 20 similarly connected to the pipe 12 by means of an annular weld 22. As will be understood, the conduit parts 16 and 20 may be formed as integral extensions of the respective conduit pipes 10 and 12, or each separate member, as shown, may be secured to the main conduit parts by any suitable fluid-tight securing means in substitution for the welded connections shown.

As best shown in Fig. 3, the conduit or pipe piece 16 is provided with an annular flange 24, and the conduit piece 20 is similarly provided with a comating annular flange 26, the flanges being secured together by an annularly disposed series of bolts 28. The flanges 24 and 26 are preferably each provided with a projecting abutment, as indicated at 30 and 32, the abutments providing a predetermined minimized area of contact between the parts, and being held in firm abutting engagement by the bolts 28. It will further be noted that the flange openings through which the bolts 28 extend are somewhat larger than the bolt bodies, whereby to provide a looseness or clearance as indicated by the reference numerals 34 and 36.

As also best shown in Fig. 3, the connector further provides a flexible sleeve member 37 composed of two portions or parts 38 and 40 welded together by an annular weld as indicated at 42, and collectively shaped so as to provide cylindrical portions lying within the respective conduit members 16 and 20, and a loop portion 44 extending a predetermined distance into the recess 45 provided between the conduit parts. Preferably the conduit members 16 and 20 are recessed to receive the sleeve parts 38 and 40, respectively, so as to provide a relatively smooth internal bore extending through the pipe connector. Sleeve part 38 is secured to the conduit member 16 by a fluid-tight connection, which is specifically in the embodiment shown an annular weld 46, and the sleeve part 40 is similarly secured to the conduit member 20 in a fluid-tight connection by means of an annular weld 48.

It will be seen that the loop portion 44 of the sleeve 37, being of relatively thin material and loop-shaped, as shown, provides flexibility in the sleeve so that the cylindrical portions of the sleeve parts may readily shift relative to each other in a transverse manner.

In accordance with the principles of the invention the pipe sections to be joined may be of different materials. Thus in the specific embodiment shown, by way of illustration, the conduit parts 10 and 16, and the weld 18 may be of suitable austenitic stainless steel, whereas the conduit parts 12 and 20, and the weld 22, may be of chrome-moly steel having a substantially different thermal coefficient of expansion. In accordance with the principles of the invention, in such instance, the flexible sleeve part 38 will also be of the same austenitic stainless steel as the conduit member 16, and the flexible sleeve part 40 will be of the same chrome-moly steel or material as the conduit member 20, whereby members 38 and 16 will have the same coefficient of thermal expansion, and members 40 and 20 will similarly have the identical coefficient of thermal expansion.

The manner of operation of the structure in use is illustrated in Fig. 4, the parts being shown in the position assumed thereby as the temperature of the conduit installation is raised, resulting in a greater expansion of the stainless steel conduit assembly 10, 16 as compared with the chrome-moly steel conduit portion 12, 20. It will be seen that the flange 24 of the conduit member 16 has moved radially outwardly relative to the flange 26 of the conduit member 20, the abutment surfaces or parts 30 and 32 assuming a corresponding offset position, and the clearance spaces 34 and 36 between the flanges and the securing bolts becoming eccentrically disposed. During such shifting of the parts the flexible sleeve member 37 experiences a similar shifting, the sleeve part 38 becoming larger or radially displaced outwardly in respect to the sleeve part 40. This movement of the sleeve parts causes the loop 44 to experience a rolling or flexing action to accommodate the shifting, but without any undue stressing of the metal fibers in the flexible sleeve, due to the looped shaping thereof and the relatively thin character of the sleeve, as heretofore mentioned.

The securing bolts 28 need be tightened only sufficiently to preclude axial separation of the conduit flanges, thus leaving the flanges relatively free for transverse shifting movement, inasmuch as the tension in the bolts is not relied upon for fluid-tightness, this function of fluid-tightness being effected by the flexible sleeve member 37. More particularly, it will be seen that the flexible sleeve part 38 expands with the conduit member 16 and the flexible sleeve part 40 expands with the conduit member 20, the two assemblies in each instance having identical rates of thermal expansion, so that the welds 46 and 48 are in no way stressed and the fluid-tightness of the connections provided thereby in no way impaired. The abutment surfaces 30 and 32 provide a reduced area of contact between the conduit flanges, facilitating such relative sliding action as is necessary to accommodate the movements of thermal expansion, and without setting up undue stresses between the parts. In other words, the abutment surfaces 30 and 32 are sufficient in area to absorb the tension in the bolts, but at the same time facilitate relative transverse sliding movements between the parts.

It will thus be seen that a pipe connector is provided of maintained fluid-tightness, but wherein the securing means comprising the bolts 28 may be tightened only sufficiently to prevent axial separation, leaving the parts free for movement in accordance with their individual coefficients of expansion, so as to avoid shear stresses, and deterioration of the parts and premature rupture of the joint. The character of the sleeve 37 is such that it does not rupture during the cycle of the parts even over protracted periods, as the metal fibers are at no time stressed beyond their elastic limit. The invention thus provides a pipe connector which permits the individual pipes in a conduit installation to be selected in accordance with the metal requirements individually encountered by each pipe member, and without regard to the different expansion rates in the juxtaposed pipe ends as the installation is subjected to wide ranges of temperature variation. The construction is of low cost and can be readily fabricated by simple bending and circular welding operations. The joint will accommodate any difference in materials and any degree of temperature variation as the individual sleeve parts are mated to the conduit members with which they are associated.

As illustrative of the degree of motion accommodated by the movement of the connection in a 12" standard pipe over a temperature range from 68° F. to 1000° F., constructed of the materials hereinabove mentioned, attention is directed to the following calculation:

Average coefficient of expansion from 68° F. to 1000° F.
  18–8 stainless steel, $10.2 \times 10^{-6}$
  Chrome-moly steel, $7.6 \times 10^{-6}$ Increase in diameter of 12" standard pipe due to temperature change. (12" pipe has outside diameter of 12.750")
  Stainless steel, $12.750 \times .000012 \times 1000 = .130''$ Chrome-moly steel,
      $12.750 \times .0000076 \times 1000 = .097''$ Difference in outside pipe diameters at 1000° F. $= .033''$ It is further to be noted that the thickness of the flexible sleeve 37 may be very materially less than that of the conduit parts 10, 16 and 12, 20. As is known, in accordance with Barlow's formula, the bursting strength of a corrugated loop such as indicated at 44 in Fig. 2 is a function of the radius R of the unsupported loop or corrugation crest in accordance with the following equation, $$P = \frac{2St}{D}$$

where:

$t$ = wall thickness
$S$ = maximum allowable working stress in p. s. i. (pounds per square inch)
$D = 2 \times R$
$P$ = allowable working pressure in p. s. i.

In a proportionate 12" diameter pipe installation such as assumed, R may be found to be approximately .140". Assuming a maximum allowable working stress at 900° F. of 10,000 p. s. i. (ASME Boiler Code maximum allowable stress, specification SA 213–T12—Chrome-moly—at 900° F. taken as an example) and a sleeve wall thickness of .080", the allowable working pressure resisted by the sleeve may be calculated as follows:

*Burst strength formula (Barlow)*

$$P = \frac{2St}{D} = \frac{2 \times 10,000 \times .080''}{.280''}$$

$P = 5700$ p. s. i. (allowable working pressure)

To calculate the pipe thickness required of the principal conduit to afford the same allowable working pressure, calculations may be made as follows:
  Assume 12.750" pipe O. D.
  Using same formula (Barlow) as for loop corrugation strength:

$$t = \frac{PD}{2S} = \frac{5700 \times 12.750''}{2 \times 10,000}$$

$t = 3.64''$ (required thickness)

It will thus be seen that a wall thickness of 3.64" is required in the principal conduit to afford the same bursting pressure resistance as a wall thickness of .080" in the flexible sleeve, with the same unit strength of materials. It will thus be seen that, in accordance with the invention, the flexible sleeve 37 may be relatively thin, for flexibility and durability, while at the same time having a high resistance to bursting pressures equal to that in the principal conduit assembly.

In Fig. 5 an embodiment of the invention is illustrated generally similar to that previously described except that a spacing sleeve 60 is interposed between the conduit flanges 24a and 26a, and the flexible sealing sleeve as indicated at 37a, functionally similar to the sleeve 37 previously described, is in this instance provided with two welded joints as indicated at 62 and 64. By means of this arrangement the sleeve parts 38a and 40a may be made to correspond, respectively, to the materials of the conduit members 16a and 20a, as in the embodiment previously described, and the middle sleeve portion as indicated at 66 may be selected of a metal best adapted to withstand flexing movement. A construction such as thus provided may be desirable in installations wherein the degree of transverse motion between the conduit flanges due to thermal expansion and contraction is extremely large.

In Fig. 6 an embodiment is illustrated wherein the flexible sleeve as indicated at 37b is made of a single metal piece. In an installation wherein the connection is to be subjected to rising temperatures, by fabricating the flexible sleeve of the same metal as the conduit member having the higher coefficient of thermal expansion (viz., the stainless steel conduit member 16b in the case of the materials above described) the conduit member 16b and the sleeve portion 38b may be relied upon to expand as a unit; whereas the sleeve part 40b, while tending to expand at a rate in excess of the conduit member 20b, is precluded from doing so by the embracing action of the conduit part. Thus, neither the weld 46b nor the weld 48b is stressed unduly in any manner and the integrity of the connection is maintained.

In Fig. 7 a still further embodiment is illustrated wherein the flexible sleeve 37c which corresponds functionally to the flexible sleeves heretofore described, is of laminated construction, viz., composed of a plurality of cylindrically nested sleeves as indicated at 70 which may, if desired, be circularly welded together along their edges as shown at 72 and 74. The sleeve plates may be one piece, and similar to Fig. 6, or of different materials welded together, as shown at 42c, along the lines of the embodiments of Figs. 1–5.

While the invention has particular applicability to the connecting of pipes of different metals, having different thermal coefficients of expansion, as has been previously discussed; it is to be understood that the invention may also be used for the connecting of conduit members of the same material. The flexible connecting sleeve in such instances serves to reduce the necessary tension in the securing bolts, as the bolts are not relied upon for fluid-tightness, the sleeve also serving to eliminate the necessity for gaskets and the like, and to compensate for irregularities in the fit and machining of the parts.

It is obvious that various changes may be made in the specific embodiments set forth without departing from the spirit of the invention. The invention is accordingly not to be limited to the particular structures shown and set forth, but only as indicated in the following claims.

The invention is hereby claimed as follows:

1. A pipe joint for permitting limited relative radial displacement comprising a first conduit member, a second conduit member having a thermal coefficient of expansion different from that of the first conduit member, clamping means spaced outwardly of the inner periphery of each said conduit member for maintaining the inner portions of the adjacent ends of said conduit members spaced a substantially fixed distance from each other but permitting limited relative radial displacement, the said inner portions of the adjacent ends of said conduit members providing an annular recess including substantially radial surfaces joining the interior of each conduit member along a smooth rounded surface, a flexible sealing sleeve member having cylindrical end portions disposed within the interior surfaces of the said conduit members and secured to said conduit members remote from said recess, said flexible sleeve member including side portions following the contour of said rounded surfaces and sides of the recess and confined throughout their lengths by contact with the adjacent surfaces of said recess and terminating in a loop portion inwardly concave throughout its extent between the side portions whereby, upon relative radial displacement between the conduit member, the loop portion will compensate for differences in radial expansion between said conduit members by a rolling action therealong with the side portions confined by the sides of the recess.

2. A pipe joint as claimed in claim 1, wherein the clamping means includes radially projecting flanges provided with abutment means therebetween defining said annular recess.

3. A pipe joint as claimed in claim 1, wherein the clamping means includes radially extending flanges having apertures therethrough, and smaller diameter bolts extending through said apertures to prevent axial separation of the conduit members while permitting relative radial displacement of the flanges.

4. A pipe joint as claimed in claim 1, wherein the end and side portions of the sleeve member are formed of separate parts each of the same material as its associated conduit member, and wherein the side portions of the sleeve member are joined by a separate intermediate loop portion having welded connections with the side portions of the sleeve member.

5. A pipe joint as claimed in claim 1, wherein the sleeve member comprises a plurality of nested cylinders forming a laminated sleeve structure.

References Cited in the file of this patent

UNITED STATES PATENTS

| Number | Name | Date |
|---|---|---|
| 978,930 | O'Malley | Dec. 20, 1910 |
| 1,191,486 | Tyler | July 18, 1916 |
| 1,359,142 | Allison | Nov. 16, 1920 |
| 1,493,269 | Kruesi | May 6, 1924 |
| 1,926,107 | Morehead | Sept. 12, 1933 |
| 2,207,146 | Fentress | July 9, 1940 |
| 2,232,657 | Davis | Feb. 18, 1941 |
| 2,234,785 | Tolman | Mar. 11, 1941 |
| 2,282,354 | Gunn | May 12, 1942 |
| 2,470,167 | Hobbs et al. | May 17, 1949 |

FOREIGN PATENTS

| Number | Country | Date |
|---|---|---|
| 312,863 | Italy | Nov. 28, 1933 |
| 397,966 | Great Britain | Sept. 7, 1933 |
| 363,835 | Great Britain | Dec. 31, 1931 |
| 386,014 | Great Britain | Jan. 12, 1933 |